July 16, 1946.   C. AMBRUSTER   2,404,158
STORAGE BATTERY PLATE
Filed June 11, 1943

AFTER EXPANSION   BEFORE EXPANSION

INVENTOR:-
CORNELIUS AMBRUSTER

BY
Augustus B. Stoughton
ATTORNEY

Patented July 16, 1946

2,404,158

UNITED STATES PATENT OFFICE 2,404,158

STORAGE BATTERY PLATE

Cornelius Ambruster, Roslyn, Pa., assignor to The Electric Storage Battery Company, a corporation of New Jersey Application June 11, 1943, Serial No. 490,397

7 Claims. (Cl. 136—55)

This invention relates to storage batteries and especially storage batteries in which are employed plates or electrodes of the tubular type comprising a series of parallel pencils of active material provided with axial conducting spines connected to top and bottom bars to produce a unitary plate structure, said pencils being surrounded by porous tubular retainers of inert non-conducting material such as hard rubber or synthetic resin. It is customary to provide porosity in such retainers by means of a series of closely spaced slots extending from the surface on opposite sides of the tube toward the center and in planes at right angles to the axis of the tube, said slots terminating short of the center, leaving two oppositely disposed unperforated longitudinal strips or ribs connecting and supporting the thin arcuate rings of material left between the slots.

It is recognized that in a storage battery of this tubular type, in service, the active material is subject to a certain amount of expansion and contraction, and it is important to keep this material under compression in order to maintain good contact between different portions of the active material and between the active material and the conducting spine. In the construction heretofore used, reliance has been placed on the actual circumferential stretching and resilience of the material of the arcuate rings to accommodate the expansion of the active material while maintaining the radial pressure. In some cases this expansion has been so great as to stretch the material of the retainer beyond its elastic limit so that upon subsequent contraction the resilience of the retainer was not sufficient to maintain the pressure, permitting the active material to disintegrate and lose contact with the conducting spine. In extreme cases the expansion of the active material has been sufficient to cause actual rupture of the arcuate rings.

An object of this invention is to provide a novel structure for the slotted tubular retainers of such storage battery electrodes which will more effectively accommodate the expansion of the active material than has heretofore been possible.

Another object of the invention is to provide a novel structure for such slotted tubular retainers which, for a given expansion of the active material, will require less circumferential stretching of the material of the retainers between the slots than heretofore required.

Another object of the invention is to provide a novel structure for such slotted tubular retainers which will accommodate a given amount of expansion of the active material without exceeding the elastic or rupture limit of the material of the retainer where such elastic or rupture limit has heretofore been exceeded.

In the structure, according to this invention, the slots in a unitary tube instead of lying in planes at right angles to the axis of the tube, are disposed in planes making an angle other than 90° with the axis and reliance is placed on the bending resilience of the rings of the retainer between the slots at and near their point of juncture with the longitudinal supporting ribs.

This invention will be more clearly understood by reference to the following description taken in connection with the accompanying drawing illustrating a preferred embodiment in which.

Figure 1:
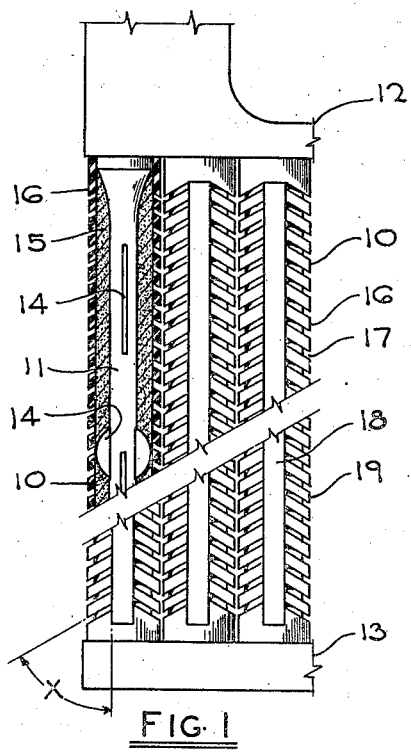
Figure 1 is a fragmentary elevation, partly in section, of a storage battery plate or electrode involving features of this invention before any deformation due to service conditions.

In the drawing 10 represents the pencil element of a tubular type of storage battery plate, comprising a central conducting spine 11 connected to the top bar 12 and the bottom bar 13. The spine 11 is provided at intervals with the usual locating fins 14 and is surrounded by active material 15. The active material is supported and retained by the cylindrical tube 16 made of hard rubber or synthetic resin, such as polystyrene or one of the copolymers of vinyl acetate and vinyl chloride, which is perforated by the slots 17, which as here shown are in parallel planes making an angle, $x$ (Figure 1), less than 90° with the axis of the pencil, for example about 25°. The slots extend from opposite sides into the tube for a distance less than half way, leaving longitudinal unperforated strips or ribs 18 which support and maintain the relative positions of the elliptical arcuate portions or bands 19.

Figure 2:
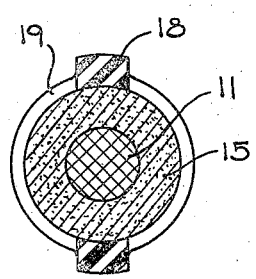
Figure 2 is a plan view of a pair of oppositely disposed arcuate portions before any expansion of the active material has occurred.

In Figure 2 is shown a plan view of a pair of oppositely disposed bands 19, whose peripheries projected on a horizontal plane are circular but which are actually elliptical in shape, being the lines of intersection of inclined planes with a cylinder.

Figure 3:
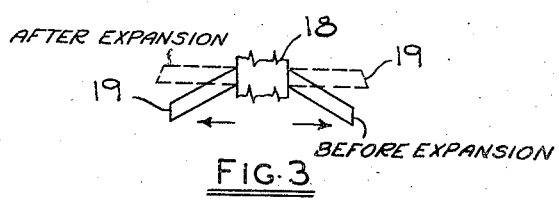
Figure 3 is a vertical elevational view of a pair of oppositely disposed bands before and after the expansion of the active material.

In Figure 3 is shown in full lines a side elevational view of the two oppositely disposed bands 19 before any expansion of the active material; and in dotted lines a similar elevation after the expansion of the active material. This expansion produces an outward pressure on the bands in a radial direction, as shown by the arrows, forcing them upward into the position shown by the dotted lines.

Figure 4:
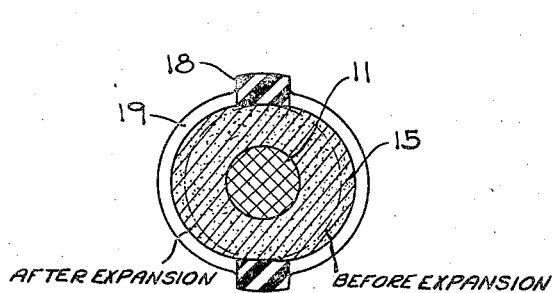
Figure 4 is a plan view of such a pair of oppositely disposed bands after the expansion of the active material.

In Figure 4 is shown the horizontal projection of these bands in the new position represented by the dotted lines in Figure 3, showing their true elliptical shape. The broken circular line in Fig. 4 represents the horizontal projection of the inner circumference of the leaves 19 before any expansion of the active material has occurred as well as the circumference of the active material before such expansion.

The deformation resulting from this pressure, as thus far illustrated, is a bending effect due to the moment of the force represented by the arrows in Figure 3 about the base of the bands where they join the ribs 18 and the result is an increase in the internal cross-sectional area of the tube which thereby accommodates the expansion of the active material. When the slots are inclined at about 25° with the vertical axis of the tube an increase of about 11% results. This increase will occur even if there were no other deformation and no actual increase in the peripheral length of the bands due to stretching. However, two other types of deformation will also occur to a greater or less extent. First, the elliptical shape of the bands will, as a result of the internal radial expansive force, in accordance with well known laws, tend to assume a circular shape, thus further increasing the internal cross-sectional area, even without any circumferential stretching of the material of the bands. The plan view of one of the leaves, after such expansion, will be identical with Fig. 2, except that the circular peripheries of the active material and the leaf will be of slightly increased diameter. There will also be a certain amount of circumferential stretching of the material, such as occurs in the structures of this type heretofore employed, with slots in planes at an angle of 90° with the axis.

It will be seen, from the above, that there is provided by this invention two new sources of increased cross-sectional area of the tubular retainer to accommodate the expansion of the active material, in addition to that resulting from the circumferential stretching of the material of the bands. As a result, in order to accommodate a given amount of expansion of the active material, less circumferential stretching will be required, keeping the resulting deformation within the elastic limit where otherwise the elastic limit would have been exceeded. Since, therefore, there is no permanent stretching of the material of the retainer, which would occur if the elastic limit were exceeded, the full resilience of the material will be effective to maintain the pressure on the active material during any subsequent shrinkage, and actual rupture which might otherwise occur is avoided.

It will be noted that in order to permit and take advantage of the increase in cross-sectional area of the tubular retainers due to the bending of the bands into the 90° position and their deformation from an elliptical to a circular shape, adjacent pencils are spaced apart. While the structure of the slotted tubular retainers above described and illustrated shows the slots 17 and intervening arcuate bands 19 extending outwardly and downwardly from the longitudinal ribs 18, it may in some cases prove advantageous to provide slots and bands extending outwardly and upwardly from the horizontal ribs.

In the embodiment of the invention herein illustrated, the arcuate bands of the tubular retainer extend outwardly and downwardly from the longitudinal supporting ribs 18. The advantages above enumerated would equally apply if the bands were arranged to extend outwardly and upwardly and such a structure would obviously come within the scope of this invention. However, the specific embodiment herein described and illustrated might, under some conditions, present an additional advantage due to the effect of the weight of the active material. It will be noted that the active material is more or less interlocked with the inner peripheries of the arcuate bands. By reason of this, the weight of the active material tends to oppose the upward bending of the bands until the expansion of the active material is sufficient to require the additional increase in cross-sectional area.

Since the longitudinal ribs 18 are not rigidly held at a fixed distance from the axis of the pencil but are free to move either further away from or nearer to that axis with changes in the configuration of the active material, the bands 19 are free to change from the elliptical to the circular shape whether they are attached to the ribs at the extremities of either the major or minor axis of the ellipse. In the former case, the ribs will be shifted toward the axis and in the latter case away from the axis.

I claim:

1. A retainer for a cylindrical element of a storage battery electrode comprising a one-piece tube of resilient insulating material whose walls are perforated by a series of closely spaced parallel slots extending from opposite points in the surface of the tube less than half way across the tube leaving two oppositely disposed narrow unperforated longitudinal strips, said slots in planes making an angle less than 90° with the axis of the tube leaving therebetween relatively thin parallel bands of elliptical periphery.

2. A retainer for a cylindrical element of a storage battery electrode comprising a one-piece tube of resilient insulating material provided with longitudinal ribs projecting from opposite sides, the walls of said tube between said ribs being perforated by a series of parallel closely spaced slots in planes making an angle less than 90° with the axis of the tube leaving therebetween relatively thin parallel bands of elliptical periphery.

3. A retainer for a cylindrical element of a storage battery electrode comprising a one-piece tubular structure of resilient insulating acid-resisting material having oppositely disposed longitudinal ribs connected by relatively thin elliptical arcuate bands extending downwardly and outwardly from the said ribs.

4. In a storage battery plate comprising a plurality of spaced apart parallel pencils of active material having axial conducting spines, the combination with said pencils of individual one-piece retainers, one surrounding each pencil, each of said retainers comprising a tube of resilient nonconducting material inert to storage battery electrolyte said tube defined by cylindrical walls perforated on opposite sides by a series of parallel slots extending from the outer surface of the tube less than half way across the tube leaving a longitudinal solid portion on either side, said slots disposed in planes at an angle less than 90° with the axis of the tube, leaving therebetween relatively thin parallel bands of elliptical periphery, whereby expansion of the active material is accommodated both by bending of the bands into planes more nearly at right angles to the axis of the tube and by peripheral deformation from the elliptical toward the circular shape.

5. In a storage battery plate of the tubular type comprising cylindrical pencils of active material the combination with each of said pencils of a one-piece tubular retainer of resilient material defined by cylindrical walls perforated by a series of closely spaced parallel slots extending from opposite sides of the tube and terminating at two oppositely disposed longitudinal ribs, said slots arranged in planes at an angle of less than 90° with the axis of the tube leaving therebetween relatively thin parallel bands of elliptical periphery and said pencils assembled in said plate in parallel spaced apart relation with said ribs projecting from opposite sides of the plate.

6. A cylindrical retainer for an element of a storage battery electrode, said retainer comprising, a one-piece tube of resilient acid-resisting material having diametrically disposed longitudinal ribs, and inclined slots extending between the ribs and through the wall of the tube, providing inclined bands between the slots and springing from the ribs and in respect to which they are bendable into horizontal position, imparting an elliptical cross-sectional area to the tube.

7. A cylindrical retainer for an element of a storage battery electrode, said retainer comprising, a one-piece cylindrical tube of resilient acid-resisting material having diametrically oppositely disposed longitudinal ribs projecting beyond the cylindrical surface of the tube and having provided through the wall of said tube slots inclined to the axis of the tube leaving therebetween relatively thin parallel bands of elliptical periphery.

CORNELIUS AMBRUSTER.